United States Patent
Sanchez Ortega

(10) Patent No.: US 11,790,514 B2
(45) Date of Patent: Oct. 17, 2023

(54) IMAGE-BASED CONTROL OF WIRE HARNESS AND CONNECTOR MANUFACTURING PROCESSES USING ARTIFICIAL INTELLIGENCE

(71) Applicant: CRIMPING & STAMPING TECHNOLOGIES, INC., Imperial, PA (US)

(72) Inventor: Edgar Ivan Sanchez Ortega, Chihuahua (MX)

(73) Assignee: Crimping & Stamping Technologies, Inc., Imperial, PA (US)

( * ) Notice: Subject to any disclaimer, the term of this patent is extended or adjusted under 35 U.S.C. 154(b) by 0 days.

(21) Appl. No.: 17/697,878

(22) Filed: Mar. 17, 2022

(65) Prior Publication Data

US 2022/0207712 A1 Jun. 30, 2022

Related U.S. Application Data

(63) Continuation of application No. 16/994,740, filed on Aug. 17, 2020, now Pat. No. 11,308,604.

(60) Provisional application No. 62/888,531, filed on Aug. 18, 2019.

(51) Int. Cl.
| | | |
|---|---|---|
| G06T 7/00 | (2017.01) | |
| G05B 19/21 | (2006.01) | |
| G06N 3/08 | (2023.01) | |
| B60R 16/02 | (2006.01) | |
| G06F 18/214 | (2023.01) | |
| G06V 10/764 | (2022.01) | |
| G06V 10/82 | (2022.01) | |

(52) U.S. Cl.
CPC ........ *G06T 7/0004* (2013.01); *B60R 16/0215* (2013.01); *G05B 19/21* (2013.01); *G06F 18/214* (2023.01); *G06N 3/08* (2013.01); *G06V 10/764* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 11,308,604 B2 * | 4/2022 | Ortega | B25J 9/1669 |
| 2021/0110951 A1 * | 4/2021 | Aramaki | H01B 13/01209 |

* cited by examiner

*Primary Examiner* — Leon Flores
(74) *Attorney, Agent, or Firm* — Gabriel & Co; Andrew M Gabriel

(57) ABSTRACT

An embodiment provides a method of operating wire harness manufacturing equipment, including: adding, using the manufacturing equipment, an element to a wire to form a combination of the element and the wire; capturing, using an imaging device, one or more of an upper image and a lower image of the combination; analyzing, using one or more processors operatively coupled to the imaging device, the one or more of the upper image and the lower image to detect a defect; and thereafter indicating that the defect has been detected. Other embodiments are described and claimed.

20 Claims, 11 Drawing Sheets

IMAGE-BASED CONTROL OF WIRE HARNESS AND CONNECTOR MANUFACTURING PROCESSES USING ARTIFICIAL INTELLIGENCE

CROSS REFERENCE TO RELATED APPLICATIONS

This application is a continuation of U.S. patent application Ser. No. 16/994,740, filed Aug. 17, 2020, which claims priority to U.S. provisional patent application Ser. No. 62/888,531, filed Aug. 18, 2019, each having the same title, the contents of which are incorporated by reference in their entirety herein.

FIELD

The subject matter disclosed herein generally relates to image-based quality control of wire harness and connector manufacturing equipment, hereafter "wire harness manufacturing equipment," such as hand tools, manual crimp presses, automatic wire processing machines, and ultrasonic welding machines.

BACKGROUND

Many industries, such as the automotive, construction, aerospace, and home appliance industries, rely on wiring for power and data communication. The wiring is typically gathered together in a grouping referred to as a wire harness. Each individual wire or cable is typically made of an insulating material that surrounds a conductive material, such as copper. A wire is often finished at the ends by the addition of a terminal, splice or weld, e.g., resistance or ultrasonic welds, to make the wire functionally useful for the given application.

The process of adding an element such as a terminal to a wire can involve mechanically crimping a terminal onto an end of the wire that has a predetermined amount of conductive material exposed from the insulating material. Various other additions may be made, e.g., splicing multiple wires together via mechanically added splice terminal, ultrasonically welding multiple wires together to form a splice, addition of a seal to a wire, etc. Such wire processing may be performed manually, e.g., using hand tools, a manual crimp press, or automatically, e.g., with an automated wire processing machine, crimping press or welding machine, or semi-automatically.

In order to monitor the output of these processes, various monitoring techniques have been developed. For example, a crimp force monitor (CFM) may be utilized to track the forces applied during crimping and output an error indication if the monitored forces deviate from a "learned" reference indicating a potential defect. Visual inspections are often utilized in addition to crimp force monitoring in order to assist in the detection of defects, e.g., defects that are difficult or impossible to detect using a CFM. For example, an operator may carry out a visual inspection manually to determine if the crimping process has successfully added a terminal to the end of a wire without any strands being pressed on top of the conductor crimp. In a computer-aided vision system, a camera system may image the wire and terminal combination in order to detect known defects using a software process.

BRIEF SUMMARY

In summary, one embodiment provides a method of operating wire harness manufacturing equipment, comprising: adding, using the wire harness manufacturing equipment, an element to a wire to form a combination of the element and the wire; capturing, using an imaging device, one or more of an upper image and a lower image of the combination; analyzing, using one or more processors operatively coupled to the imaging device, the one or more of the upper image and the lower image to detect a defect; and thereafter indicating that the defect has been detected.

Another embodiment provides a method, comprising: adding, using wire harness manufacturing equipment, an element to a wire to form a combination of the element and the wire; capturing, using an imaging device, one or more of an upper image and a lower image of the combination; analyzing, using one or more processors operatively coupled to the imaging device, the one or more of the upper image and the lower image to detect if a defect is present; thereafter indicating that the defect has not been detected; and incorporating at least the combination of the element and the wire into a wire harness.

A further embodiment provides an executable program product that includes code that obtains, from an imaging device, one or more of an upper image and a lower image of a wire and element combination; analyzes, using one or more processors, the one or more of the upper image and the lower image to detect a defect; and thereafter indicates that the defect has been detected.

A still further embodiment includes a method, comprising: obtaining, from an imaging device, one or more of an upper image and a lower image of an element added to a wire to form a combination of the element and the wire; analyzing, using one or more processors, the one or more of the upper image and the lower image to detect a defect; and thereafter indicating that the defect has been detected.

A yet further embodiment includes a product formed by one or more of the foregoing processes.

The foregoing is a summary and thus may contain simplifications, generalizations, and omissions of detail; consequently, those skilled in the art will appreciate that the summary is illustrative only and is not intended to be in any way limiting.

For a better understanding of the claimed embodiments, reference is made to the following description and the accompanying drawings.

DETAILED DESCRIPTION

Figure 1:
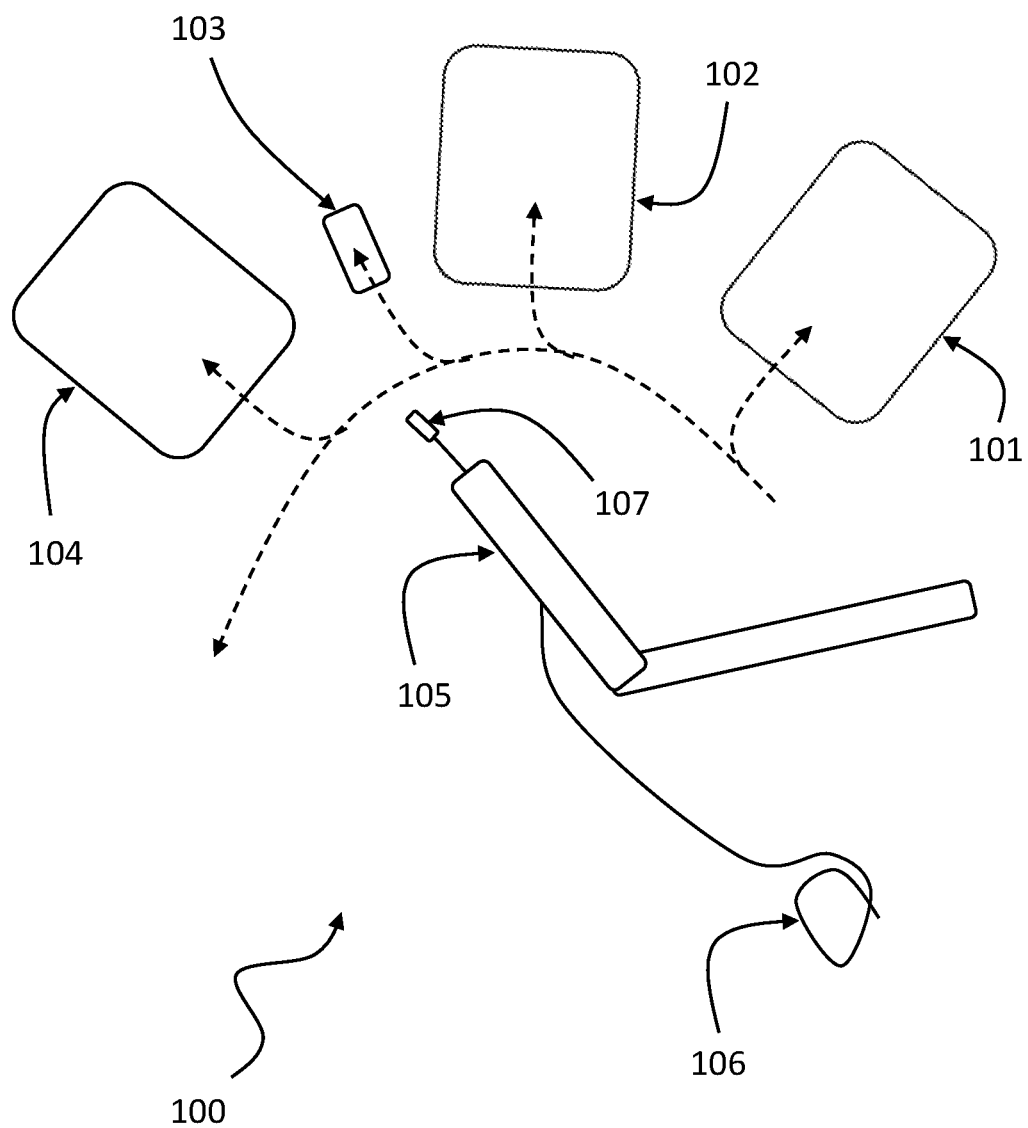
FIG. 1 illustrates an example automated crimping system according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims but is merely representative of those embodiments.

Reference throughout this specification to "embodiment(s)" (or the like) means that a feature, structure, or characteristic described in connection with the embodiment is included in at least one embodiment, which may or may not be claimed. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

Existing visual inspection techniques for quality control in wire harness manufacturing typically fall into two categories, i.e., manual inspection and computer-aided vision inspections. Each of these conventional techniques is difficult to set up, implement, and can be unreliable in certain circumstances.

Having an operator visually inspect terminal additions, seal additions, welds or like additions, either with an unaided eye, with a microscope, or even using cross-section analyses, relies on the operator's skill, judgement and attention to detail. Further, even if performed correctly, operator visual inspection is labor intensive, expensive and typically only about 80% effective (i.e., only about 80% of defects are detected).

Conventional computer-aided vision systems address some of these concerns; however, existing camera systems introduce other difficulties. Conventional automated camera systems, e.g., added into the process line of an automated wire processing machine, require software customized, using a unique program, for each type of wire and element (e.g., terminal) that is used. That is, these programs are created to analyze a particular wire and element combination using a teach-in process. The teach-in process typically includes creating a library of images, taken for the particular wire and element combination. These images are captured using the specific machine, e.g., automated wire processing machine, and camera set up in question. An operator then selects a best or master image as a reference image. The master or reference image is used to organize specific inspection windows for defect detection. This teach-in process results in a specific program being built to analyze the particular wire and element combination. If another wire and element combination is used, it requires loading of a different crimp inspection program formed using a similar teach-in process.

Further, conventional vision systems rely on precise alignment of the wire and terminal combination such that the image captured is substantially the same each time. That is, conventional vision systems capture an image with precise timing and alignment, referenced to the master or reference image of the teach-in process, for analysis. This precise alignment is required for the system to reliably "find" the terminal in the camera's field of view and perform the programmed inspection tasks. Because conventional vision systems are sensitive to the alignment of the wire and terminal combination, a teach-in process and adjustment of related inspection windows may be required at the start of each new production run. That is, each new setup is unique in terms of how the wire and terminal combination is presented to the camera system, and therefore a teach-in process may be required for each setup and cannot be avoided. Conventional vision systems require a unique program to be created for each combination of terminal and wire. Any change to the system, e.g., changing wire type, terminal type, etc., requires a new teach-in and program creation. Teach-in process and program creation is complex and requires a skilled person, normally not a machine operator.

Embodiments of the invention resolve the problems with conventional vision inspection systems by introducing an artificial intelligence program that significantly reduces the complexity of system set up and operation without sacrificing quality. In an embodiment, an artificial intelligence program is utilized to identify the object of interest, e.g., a terminal element added to the end of an insulated wire. This object identification is not sensitive to the alignment or orientation of the wire and terminal combination, i.e., so long as the object of interest is presented in the field of view of the camera(s), the inspection process may be successfully completed. Further, precise timing is not essential, and embodiments can use video cameras to detect defects using images of objects of interest, e.g., even if the object of interest is simply manually waived in the field of view of the camera(s) by an operator.

An embodiment uses the object identification to directly or indirectly perform image-based defect detection. In an embodiment, the object identification can be used to choose subsequent image-based processing steps. For example, the object identification may be used to set a bounding box around the object and to thereafter place one or more inspection windows in image area(s) of interest for additional image processing, e.g., pixel-based RGB color analysis, hue light saturation (HLS) analysis, pattern matching, etc.

In an embodiment, an object's initial identification, e.g., identification of a particular terminal type added to a wire, may be used to automatically select an appropriate image analysis program, e.g., selection of a specific neural network for that part. The initial identification may use an artificial intelligence program or another type of identification, e.g., scanning of a code or manual entry.

In an embodiment, the object identification may be used directly for defect detection. For example, the object identified in the image may be the defect itself by training the neural network to identify the defect in question.

Further, embodiments described herein do not require a program selection, teach-in process, or program adjustments and therefore can begin operating in a given installation without any customized set up. This makes the system much easier to install and use, particularly by inexperienced operators. Likewise, an embodiment permits easily switching between types of wires and elements that are to be analyzed. For example, an embodiment can detect an object type, e.g., crimped terminal, splice, ultrasonic weld, resistance weld, etc., and automatically implement the appropriate image processing steps for analyzing the images and detecting the defects unique to that object type. Embodiments are therefore more flexible and generally applicable to various terminal, splice, and weld visual inspections that might be encountered in the production process.

The description now turns to the figures. The illustrated example embodiments will be best understood by reference to the figures. The following description is intended only by way of example and simply illustrates certain selected example embodiments.

A system has been designed to recognize object characteristics through cameras, e.g., video cameras, and a computer that processes the images, detects the desired characteristics, and makes a decision whether a part is accepted or rejected (contains a defect) according to the parameters programmed, e.g., trained into the neural network.

FIG. 1 illustrates an example of a process that may be controlled automatically according to an embodiment. In the example of FIG. 1, an automated wire processing machine and related machinery are illustrated as system 100. This machinery includes components used to prepare a wire for use in an automotive wire harness, for example. The system 100 includes a cutting component 101, e.g., to cut an insulation coating of the wire 106. A robotic arm 105 may insert, remove and progress the wire 106 from one component to the next, as generally illustrated by the dashed arrows in FIG. 1. The wire 106 is progressed by robotic arm 105 to a terminal crimping component 102, e.g., for adding a terminal 107 to the wire 106 using a crimping process. The robotic arm 105 then moves the wire 106 and terminal 107 combination to an imaging device 103 for imaging the top and bottom of the combination. If the image analysis process being applied indicates that there are no defects detected, the robotic arm 105 next takes the wire to a cutting component 104, which cuts the wire 106 at an appropriate length for the given application. The system 100 can then repeat the process.

Figure 2:
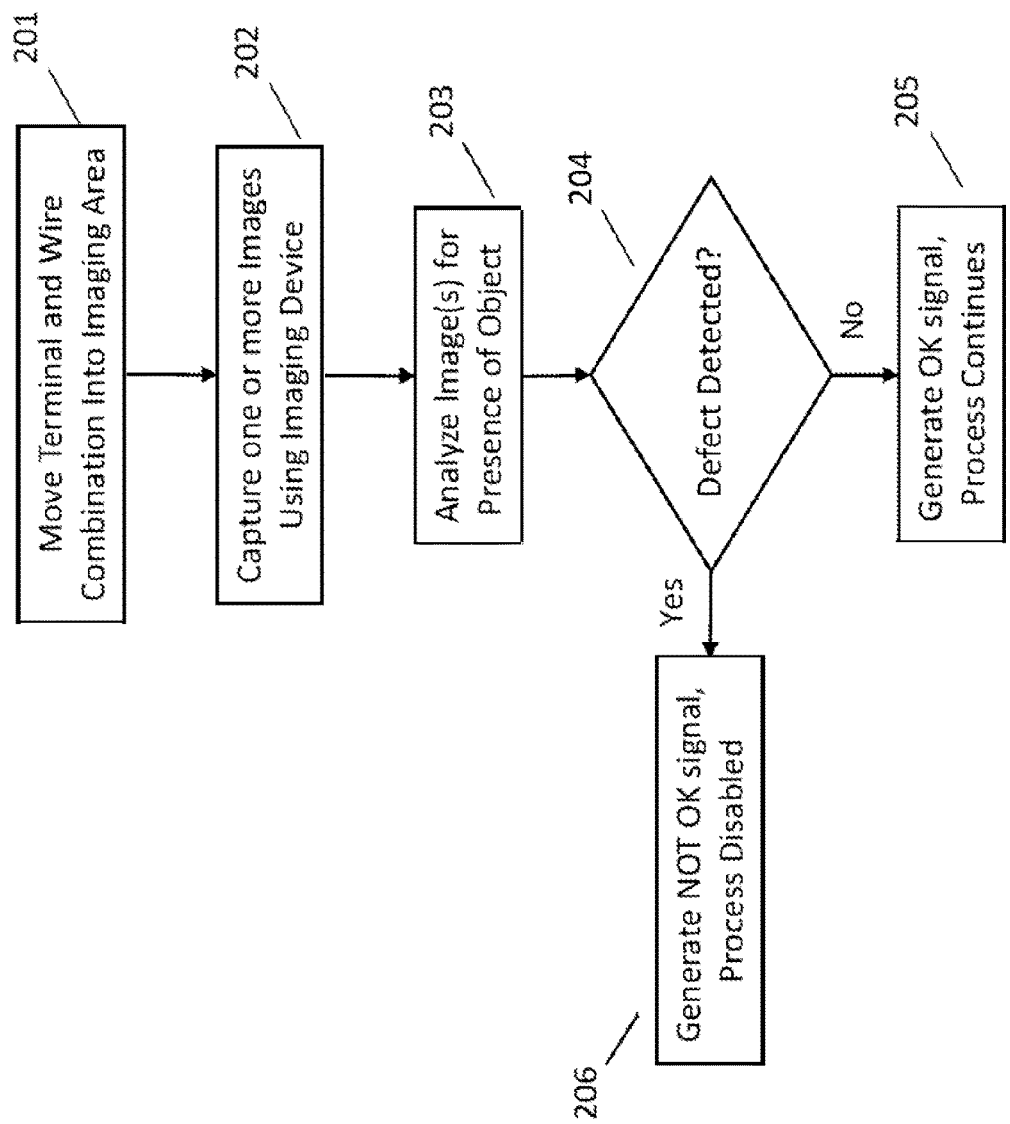
FIG. 2 illustrates an example method for image-based quality control according to an embodiment.

FIG. 2 illustrates an example process according to an embodiment. At 201 the item to be visually inspected, e.g., a wire and an element such as a terminal, are moved, e.g., using robotic arm or manually, to an imaging area, e.g., within the field of view of an imaging device with upper and lower cameras. One or more images are then captured of the combined wire and element at 202. This may include, for example, capturing an upper image and a lower image of the wire and element combination at substantially the same time using one camera positioned above the wire and element combination and one camera positioned below the wire and element combination.

At 203, the image(s) captured at 202 are analyzed for the presence of an object of interest, e.g., the combination of the wire and a terminal. In an embodiment, the object of interest is first identified and thereafter additional image processing is applied to determine if a defect is detected, as indicated at 204. In another embodiment, the object of interest is the defect itself, i.e., identification of the object can directly lead to a defect detection decision, combining steps 203 and 204.

Irrespective of the processing applied, an embodiment will indicate if a defect has been detected and choose different processing depending on the result, as decision point 204 indicates. For example, if no defect is detected, an embodiment outputs an OK signal, which permits the process (e.g., robotic arm) to continue in its cycle or enables a machine to be utilized (e.g., allows a foot pedal of a manual pressing machine to operate the press). If a defect has been detected, a NOT OK signal is generated, which disables or inhibits the process (e.g., robotic arm) from continuing in its cycle or disables a machine from being utilized (e.g., disables a foot pedal of a manual pressing machine from operating the press). In this way, image analysis is implemented to control the processing of wire combinations (e.g., terminal additions, splices, ultrasonic welds, etc.) with respect to visual quality detection.

Figure 3:
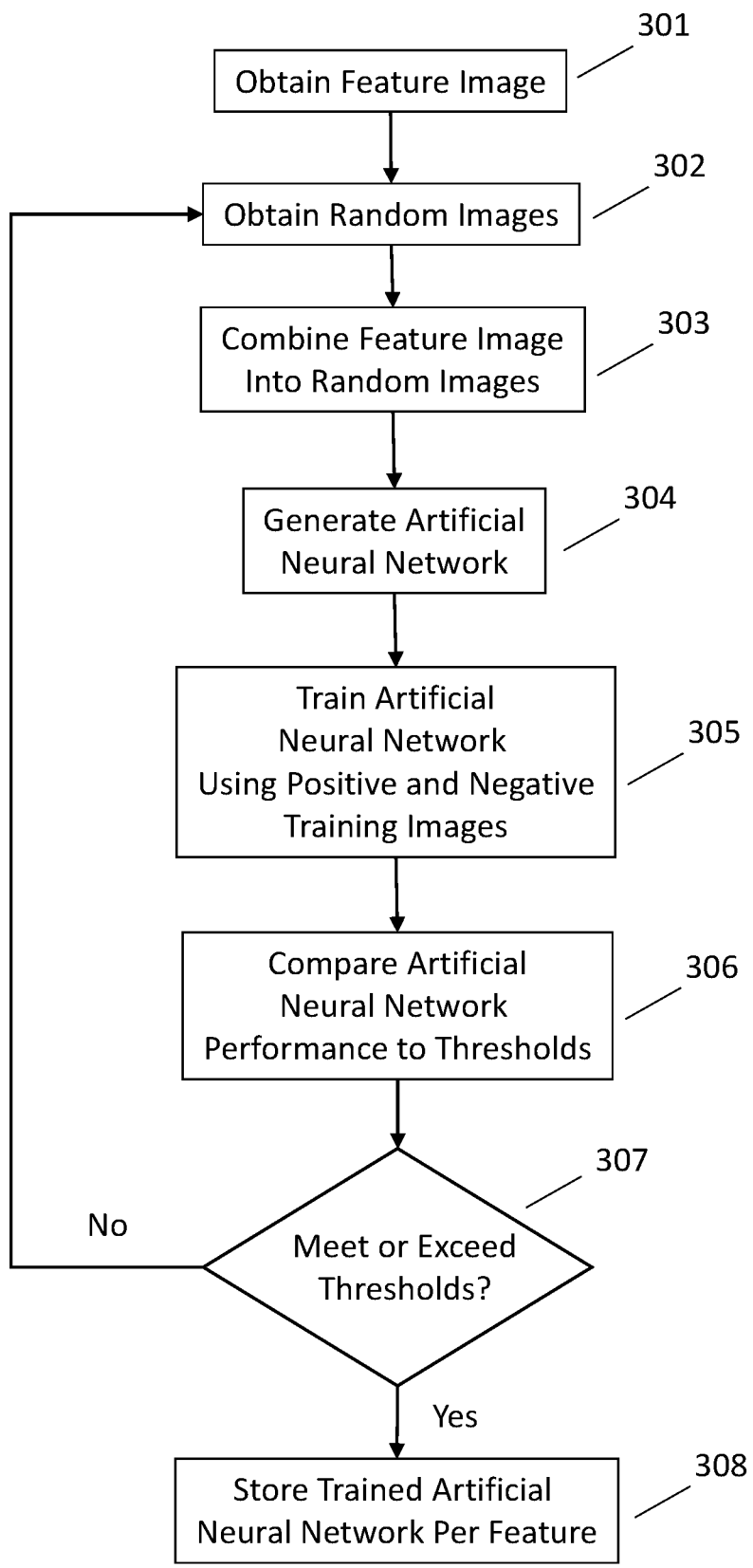
FIG. 3 illustrates an example method for generating an artificial neural network according to an embodiment.

FIG. 3 provides an example method of preparing an artificial neural network to perform image analysis and object identification outlined in steps 203 and/or 204 of FIG. 2. As illustrated in the process outlined in FIG. 3, an embodiment uses artificial neural networks to detect patterns of the desired characteristics in the image obtained by the camera(s). Such a process is much faster than comparing the images obtained by the camera using pixel analysis, as is commonly done in existing visual inspection software. Further, the artificial neural networks of an embodiment are not sensitive to many of the variables that perturb conventional systems, such as lighting or orientation or alignment of the object of interest. This in turn makes it possible to use smaller and low-resource hardware, e.g., such as the JETSON NANO from Nvidia Corporation and low-cost cameras, as further described herein.

In an embodiment, an artificial neural network is created by an artificial intelligence script. Illustrated in FIG. 3 are example steps for generating an example artificial neural network. The steps of FIG. 3 (or like steps) only have to be performed one time for the generation of the neural network. Thereafter, the system uses the generated neural network to process the images, without requiring a program selection, teach-in process, or program adjustments.

At 301, at least one feature image is obtained that includes the object or feature that is to be recognized. This image only contains an image of the object or feature to be recognized, i.e., any unwanted features that are not to be recognized should be removed from the image. More than one feature image may be used. For example, if the system is to be trained to recognize an object or feature in multiple colors, a feature image of the feature in each such color should be obtained.

The feature image(s) obtained for the object or feature of interest are placed in a particular location, e.g., folder or storage location, to generate the artificial neural network. A program is then run to generate the neural network. By way of example, the program downloads a set of random training images at 302, e.g., 10,000 or more public images from the Internet using Google Big Data Service, and stores them into a storage location or folder. Once downloaded, the training images can be reused for generating another neural network (e.g., to identify a second feature), i.e., there is no need to download new or more images, unless more images are desired to further train the neural networks. That is, with more training images, the learning will be more precise; although the process will take more time to complete. In one example, the system can be programmed to automatically calculate the cost—benefit of such additional training and fix the number of training images at an optimal value for each learning phase, e.g., using a learning profit algorithm.

The program then combines (e.g., inserts or overlays) the feature image into each of the random training images at 303. An example overly is illustrated in FIG. 10, which illustrates a feature image 1001 (crimped wire terminal)

overlaid on a training image 1002 (a dog picture). A negative image includes a training image 1002 that lacks the feature image 1001. In each image a distortion may be applied to the feature image with the desired characteristic to modify its shape and position slightly. This distortion is registered into a text file that saves the position where the feature image has been placed inside the background image (random training image). This permits the software to know the ground truth of where the feature image to be searched for is located in the training image that has had the feature inserted at a random position. For example, a line of text is generated for each random training image that is used as the background image for the feature image. By way of specific example, at the end of the file name the coordinates of the inserted feature image are specified, e.g. in a spreadsheet file where the line position is the image number and the trailing number series are the coordinates of the feature image:

Line position: (file name-Positive-Coordinates) 0015_0086_0033_0078_0045.jpg 1 86 33 78 45.

Figure 10:
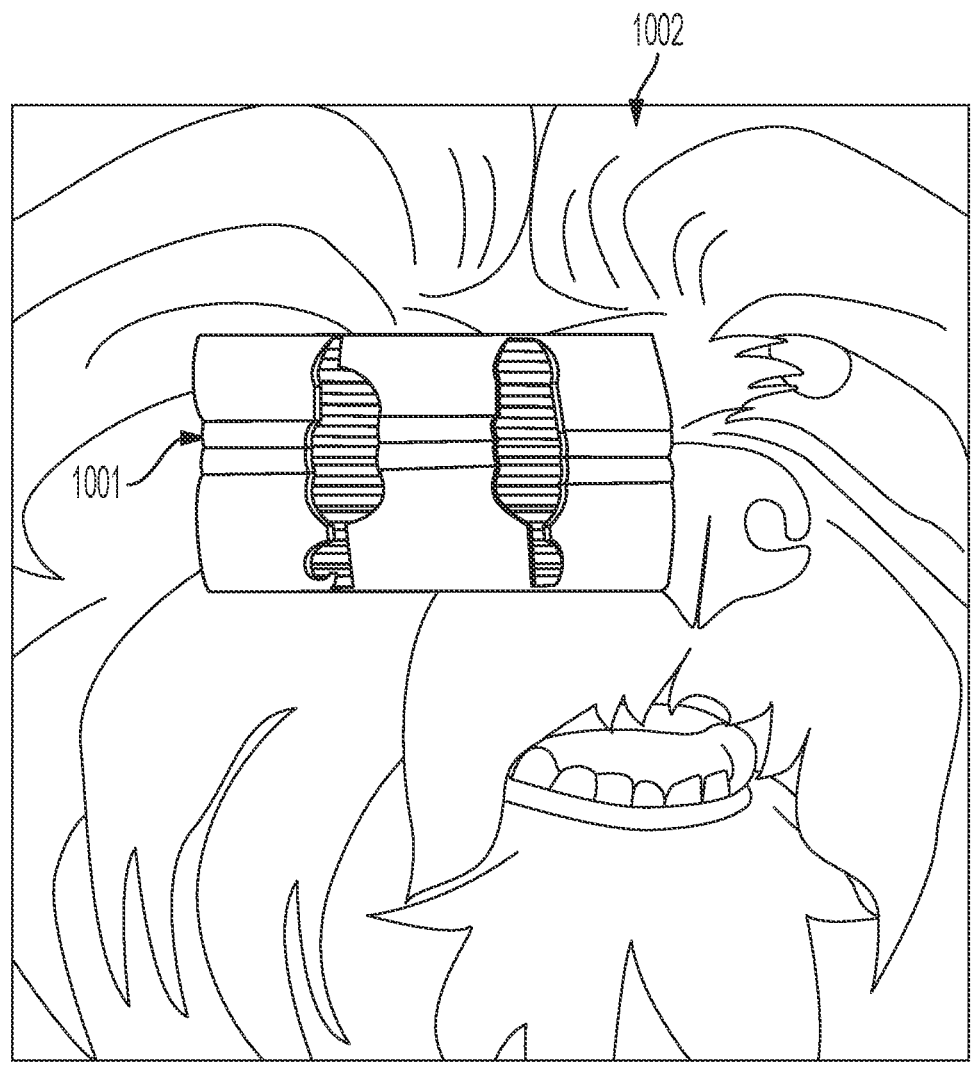
FIG. 10 illustrates an example of a feature of interest embedded in a random neural network training image.

Thereafter, the software generates the images with the feature image already embedded in the background image (random training image), e.g., as illustrated in the example of FIG. 10, in another folder where the positive images will be stored (images containing the object to be found and the position where it is inside the image). Negative images are also stored and used for training the artificial neural network. At the end of this procedure (steps 301-303), there are two folders or storage locations, i.e., one with the background images alone (i.e., random training images without the feature image inserted) and another with the same images already with the feature image inserted. These folders are used to generate and train the artificial neural network, as illustrated at 304-305.

By way of specific example, using these files (N negative images and N positive images), an embodiment starts neural network training for example by using the OpenCV Version 3.4.1 library. An embodiment gets parameters, e.g., from OpenCV, to process the neural network, as indicated at 304. An embodiment creates N number of images from at least 1 sample in order to train the neural network at 305. This eliminates the need to have N number of samples for this process, accelerating the time for neural network generation. This further facilitates being able to train another artificial neural network automatically without the need for human intervention, since an embodiment takes the random training images and generates positive and negative images, allowing the training to start the learning process automatically.

Once the learning process is complete, an embodiment automatically checks the decisions made by the neural network at 306 by comparing the decisions made to the ground truth using the list of images and the position where the feature image of the object or feature was placed. This permits an embodiment to recognize the effectiveness of the neural network by comparison to predetermined threshold(s) (e.g., threshold(s) for acceptable number of false positives, false negatives, or a combination thereof). If this trained artificial neural network meets with the minimum threshold(s), as determined at 307, it is saved as indicated at 308, e.g., as an xml file in a storage location for use in the production process (outlined in FIG. 2). Otherwise, the artificial neural network can be re-trained, e.g., by obtaining more random images and repeating the process, as indicated. A similar process can be completed for each feature or object of interest, e.g., one trained artificial neural network can be obtained for each combination of wire and terminal, or each splice, or each weld. The training may be per class or type of feature or part, e.g., a neural network trained to recognize any of a family of parts such as standard B crimps, indenter crimps, etc. Again, the appropriate stored artificial neural network can be loaded automatically later given an indication of the terminal or part number to be analyzed.

Figure 4:
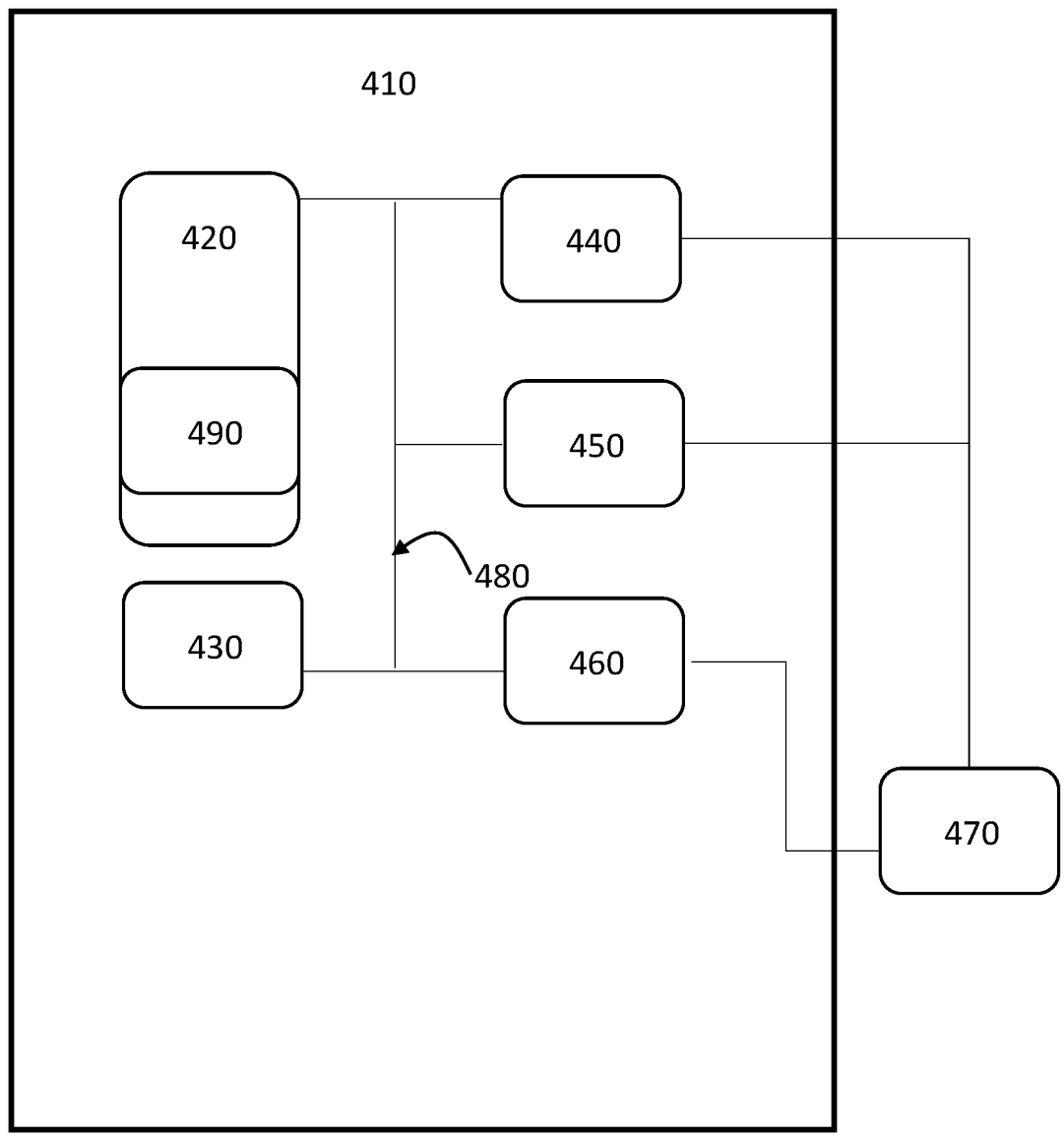
FIG. 4 illustrates an example computer system according to an embodiment.

Referring to FIG. 4, the artificial neural network, e.g., trained and stored in a file as above, is used by the computer 410 or other device having circuitry, e.g., an APU (Accelerated Processing Unit), indicated at 420, which consists of a central processing unit (CPU) and a graphics processing unit (GPU). Cooling airflow may be supplied by a fan 490, which may be located proximate to the APU 420, as illustrated. Computer 410 includes random access memory (RAM) 430 as well as input and output interfaces 440, 450, respectively, for exchanging data with I/O devices such as remote devices 470 (e.g., USB devices, Ethernet connected devices, and HDMI devices, etc.). By way of example, some or all of the elements of computer 410 can be included in a single chip, a so-called system-on-chip (SoC), collocated on a main board, or components included in a computer 410 may be implemented as a distributed computing system. In one example embodiment, all of the elements of the computer 410 of FIG. 4, except the remote device(s) 470, are contained within a single case or housing having a size of about 90 mm wide, 60 mm high, and 110 mm long.

The example system-on-chip (SoC) or similar circuitry outlined in FIG. 4 may be implemented in a variety of devices in addition to the computer 410, for example similar circuitry may be included in a cloud or networked device, e.g., remote device 470, or another device or platform. In addition, circuitry other than a SoC may be utilized in one or more embodiments. The SoC of FIG. 4 includes functional blocks, as illustrated, integrated onto a single semiconductor chip to meet specific application requirements.

The APU 420, which may include a number of graphics processing units (GPUs), e.g., 128, and/or micro-processing units (MPUs), e.g., AMR A57 Quad Core Processor, 1.43 MHz, includes an arithmetic logic unit (ALU) that performs arithmetic and logic operations, instruction decoder that decodes instructions and provides information to a timing and control unit, as well as registers for temporary data storage. Again, the APU 420 may comprise a single integrated circuit comprising several units, the design and arrangement of which vary according to the architecture chosen. One suitable APU is for example the JETSON NANO sold by Nvidia Corporation.

Computer 410 also includes a memory controller, e.g., comprising a direct memory access (DMA) controller to transfer data between memory 430 and hardware peripherals. Memory controller includes a memory management unit (MMU) that functions to handle cache control, memory protection, and virtual memory. Computer 410 may include controllers for communication using various communication protocols (e.g., I$^2$C, USB, etc.).

Memory 430 may include a variety of memory types, volatile and nonvolatile, e.g., read only memory (ROM), RAM, electrically erasable programmable read only memory (EEPROM), Flash memory, and cache memory. Memory 430 may include embedded programs and downloaded software, e.g., image processing software such as the artificial neural network program referenced herein, etc. By way of example, and not limitation, memory 430 may also include an operating system such as a Linux operating system, application programs, other program modules, and program data.

A system bus 480 permits communication between various components of the computer 410. I/O interfaces 440/450 and network interface 460, including for example radio frequency (RF) devices, e.g., WIFI and telecommunication radios, are included to permit computer 410 to send and receive data to remote devices 470 using wired or wireless mechanisms. The computer 410 may operate in a networked or distributed environment using logical connections to one or more other remote computers or databases, all of which are indicated collectively at 470. The logical connections may include a network, such local area network (LAN) or a wide area network (WAN) but may also include other networks/buses. For example, computer 410 may communicate data with and between remote devices 470.

The computer 410 may therefore execute program instructions configured to store and analyze image data and perform other functionality of the embodiments as described herein. A user can interface with (for example, enter commands and information) the computer 410 through input devices, which may be connected to I/O interfaces 440, 450. A display or other type of device may also be connected to the computer 410 via an interface selected from I/O interfaces 440, 450, such as an output interface 450.

In one example embodiment, a system for controlling wire processing machinery includes four main devices, i.e., a computer 410 (including APU 420), two cameras, and a base for mounting the cameras. In this non-limiting example, the APU 420 is responsible for storing the operating system, OpenCV libraries and software for image analysis and signal generation. An example of system specifications are as follows: ARM A57 Quad Core Processor, 1.43 MHZ or higher, Maxwell 128 Core GPU, 4 GB 64-Bit LPDDR4 RAM Memory, 32 GB micro SD (image and other storage), two 3.4 mega pixel×60 FPS cameras with low light technology, gigabit Ethernet port, M.2 Key E (solid state drive), HDMI Port 2.0 and/or Display Port 1.4, four USB 3.0 ports, and ten GPIO ports.

Figure 5:
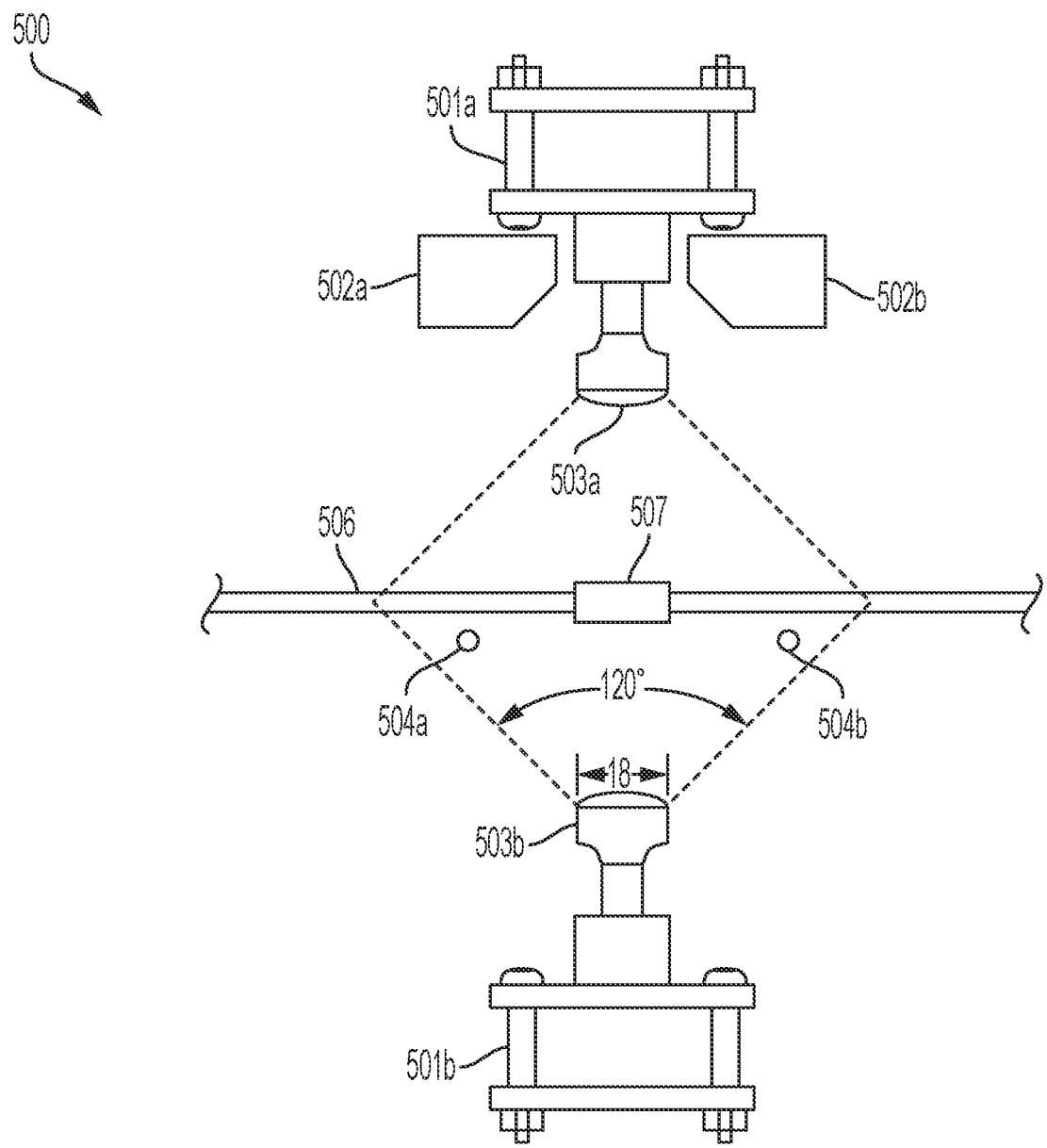
FIG. 5 illustrates an example imaging device according to an embodiment.

Referring to FIG. 5, example components of an imaging device or system 500 are illustrated. In an embodiment, two cameras 503a, 503b, e.g., a pair of 3.4 MP USB 3.0 cameras, are included and are operatively coupled to the APU (illustrated at 420 of FIG. 4) to capture the upper and lower images of the object of interest, e.g., crimped wire 506 and terminal 507, weld, etc. The cameras 503a, 503b may be placed within mounting structures 501a, 501b such that the cameras are on top of each other and face one another in an upper and lower configuration. Optionally, one or more LEDs, e.g., two upper LEDs 502a, 502b are illustrated in FIG. 5, may be included to increase the lighting and improve imaging quality. In the example of FIG. 5, two upper LEDs 502a, 502b are illustrated and two lower LEDs (not illustrated) may also be included in similar lower locations. The LEDs 502a, 502b can be secured into place using an outer shell or housing, as described in connection with the example of FIG. 6. In an embodiment, the cameras 503a, 503b are separated from one another with a separation of approximately 30 mm to 50 mm, and in one example by about 40 mm. Both cameras 503a, 503b point towards the center as illustrated in FIG. 5. The cameras 503a, 503b each afford a wide-angle view, e.g., each covering about 120 degrees and having lenses measuring about 18 mm, as illustrated.

An object to be analyzed, e.g., a wire 506 and terminal 507, is placed in the center of the imaging device 500, e.g., manually by an operator. For manual operation, a pair of stabilizing elements 504a, 504b optionally may be included to assist the operator in placing the object in view of the cameras. This orients the object to be imaged roughly in the middle of the two cameras 503a, 503b. Again, this positioning can be accomplished either manually or by some mechanical device, as the imaging analysis is not sensitive to precise alignment. In this way, the cameras 503a, 503b will take images of the top and bottom of the object to have a 360-degree view of the object.

Figure 6:
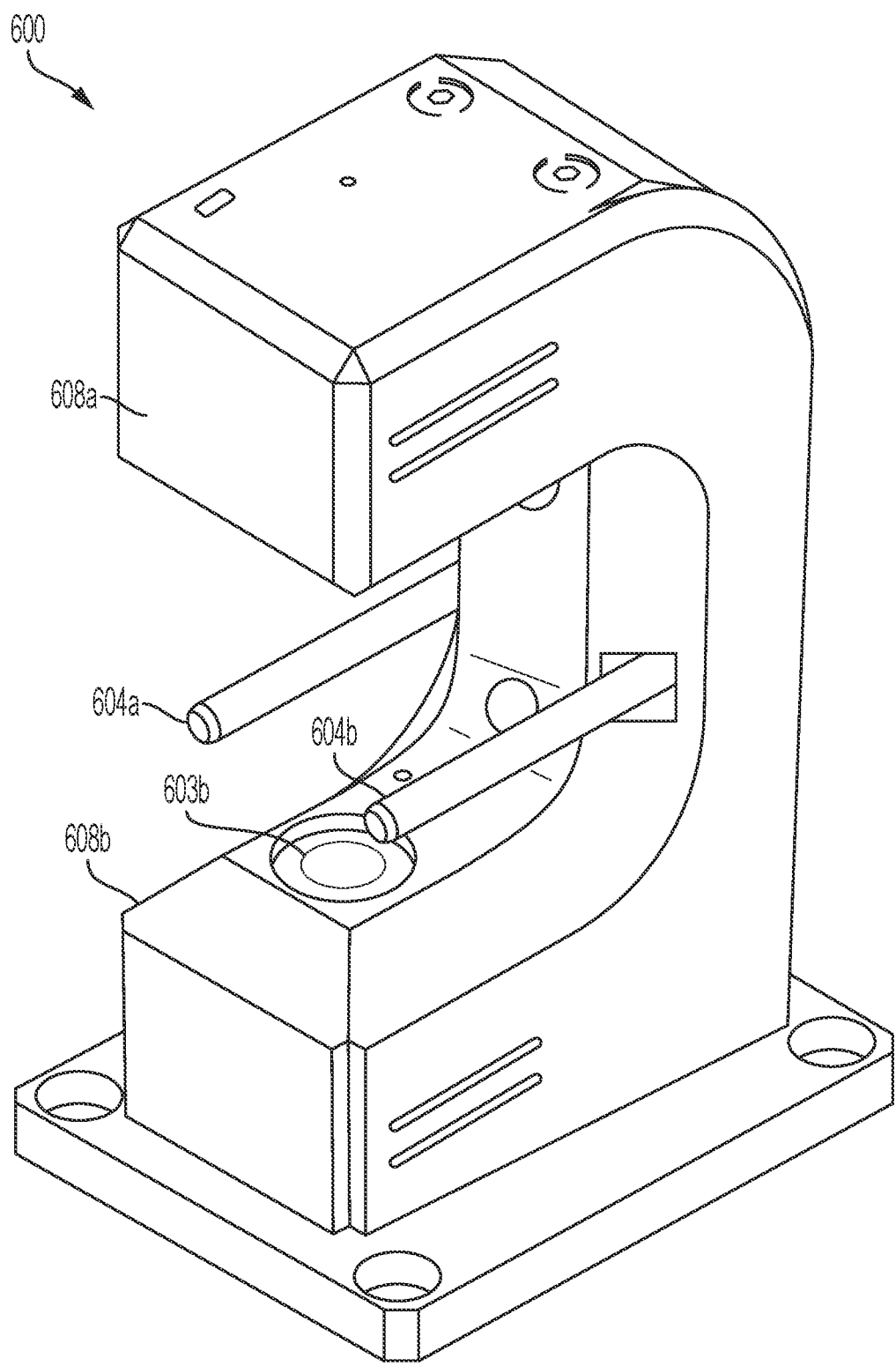
FIG. 6 illustrates an example imaging device according to an embodiment.

FIG. 6 illustrates an example implementation of the imaging device of FIG. 5, when enclosed in an outer shell. In the example view of FIG. 6, the imaging device 600 generally includes an upper part 608a and a lower part 608b that each house a camera, one of which, i.e., camera 603b, is illustrated in the lower part in the example perspective view of FIG. 6. Also visible are the stabilizing devices 604a, 604b, which are positioned just below the midpoint between the cameras, assisting an operator to place the object to be identified in a correct position on top of stabilizing devices 604a, 604b when manually positioning the object of interest for imaging. In the example of FIG. 6, the cameras, e.g., lower camera 603b, again include lens elements that are about 18 mm in diameter, and are separated by about 40 mm. The housing is about 80 mm in depth, about 140 mm long, and roughly 40 mm wide, with a wider base being optional.

Figure 7A:
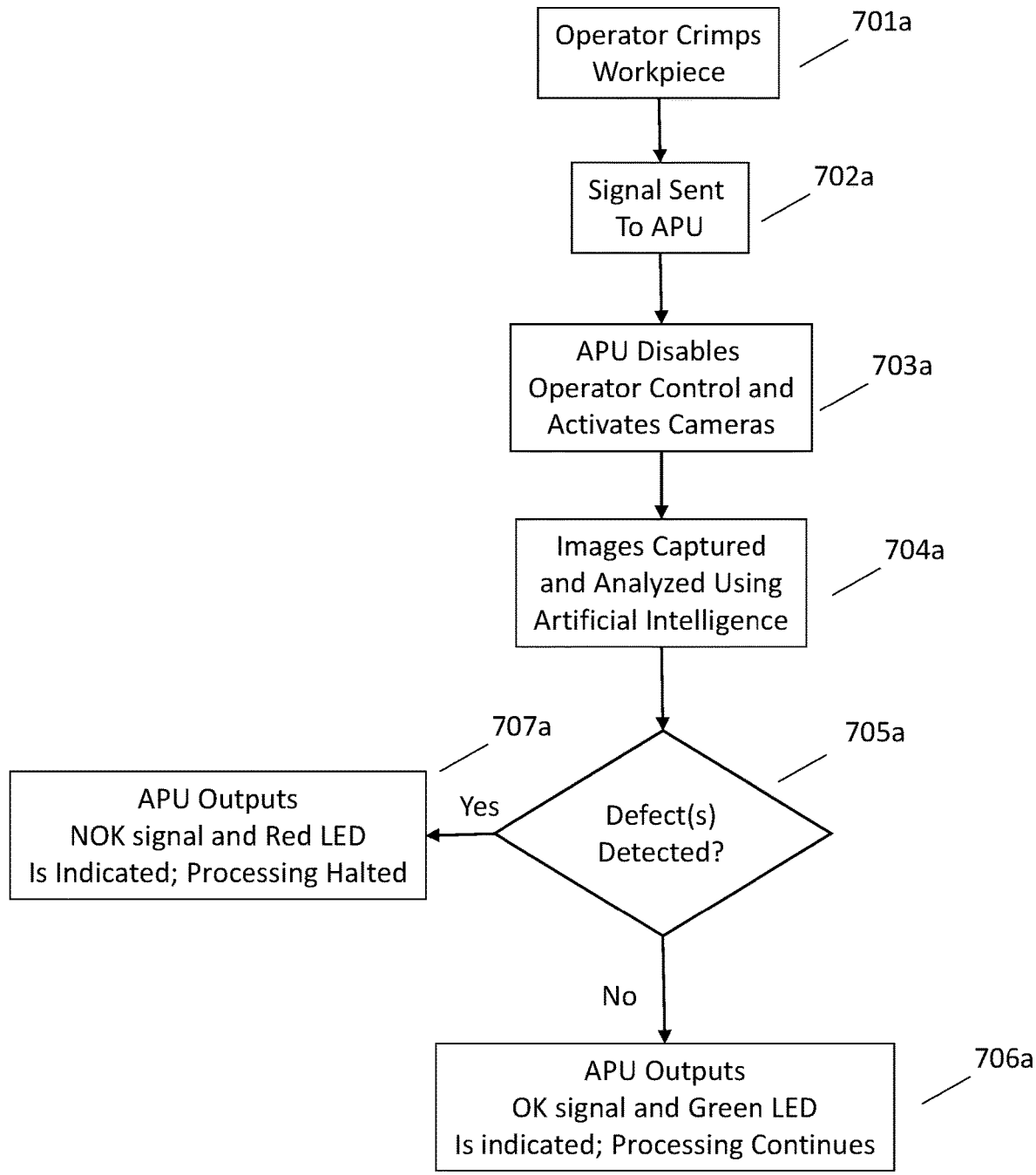
FIG. 7A illustrates an example method of controlling a manual press using image-based defect detection according to an embodiment.

An example procedure for crimp inspection in a manual press is illustrated in FIG. 7A. When an operator crimps a wire in the manual press at 701a, e.g., using a foot pedal that actuates a crimping mechanism to crimp a terminal onto a wire, a cycle signal is sent to the APU at 702a, which receives the cycle signal via the GPIO ports, e.g., generally indicated at 440 of FIG. 4, or other suitable communication mechanism. After this cycle signal is received by the APU, a foot switch (pedal control) is disabled by the APU at 703a so that another part cannot be processed until the terminal is placed in view of the cameras for analysis and further signal processing is accomplished, as described below.

After receiving the cycle signal at 702a, the APU opens the cameras at 703a to capture upper and lower images, as indicated at 704a, and initiates the recognition processing, i.e., the process of automatically performing image analysis to determine if a defect is detected, as illustrated at 705a. By way of specific example, once the operator places the crimped terminal (or other object of interest to be evaluated) at the base of the imaging device, e.g., on top of stabilizing devices 604a, 604b of FIG. 6, the APU utilizes an artificial neural network, e.g., as described in connection with FIGS. 2-3, to detect the location of the terminal in the upper and lower images. This initial detection of the object's location using artificial intelligence allows the system to thereafter automatically locate the object in the image, e.g., with a bounding box, even if the image is of low quality, e.g., because the manually presented terminal and wire combination is oriented at a random angle or is offset from the image center in a random fashion due to manual placement.

Once the object has been located in the image, which may be a collection of streamed images or video data, the system can utilize different techniques to make the decision at 705a as to whether the wire and terminal combination (or other part(s) or features of interest) includes a defect, as further described in herein. If no defect is detected at 705a, the system indicates the same and processing is allowed to continue, as indicated to 706a. By way of specific example, when no defect is detected at 705a, the system turns on a red, green, blue (RGB) LED bank, located in view of the operator, to actuate a green LED to alert the operator that the part is good, the foot switch is enabled, and the image analysis system is put on hold for another cycle signal to start the process again. In case the defect is detected at 705a, the process is halted, as indicated at 707a. By way of specific example, if a defect is detected a 705a, the system will operate the RGB LED bank to actuate the red LED to alert the operator that the part is bad and stay active to halt the system until the defect is cut (automatically or manually) or a quality control person releases the system, e.g., by scanning an ID tag. For example, after a quality control manager has arrived, the ID tag of the operator or the manager will be scanned, and the system will enable the foot switch so that the cycle may start again.

Figure 7B:
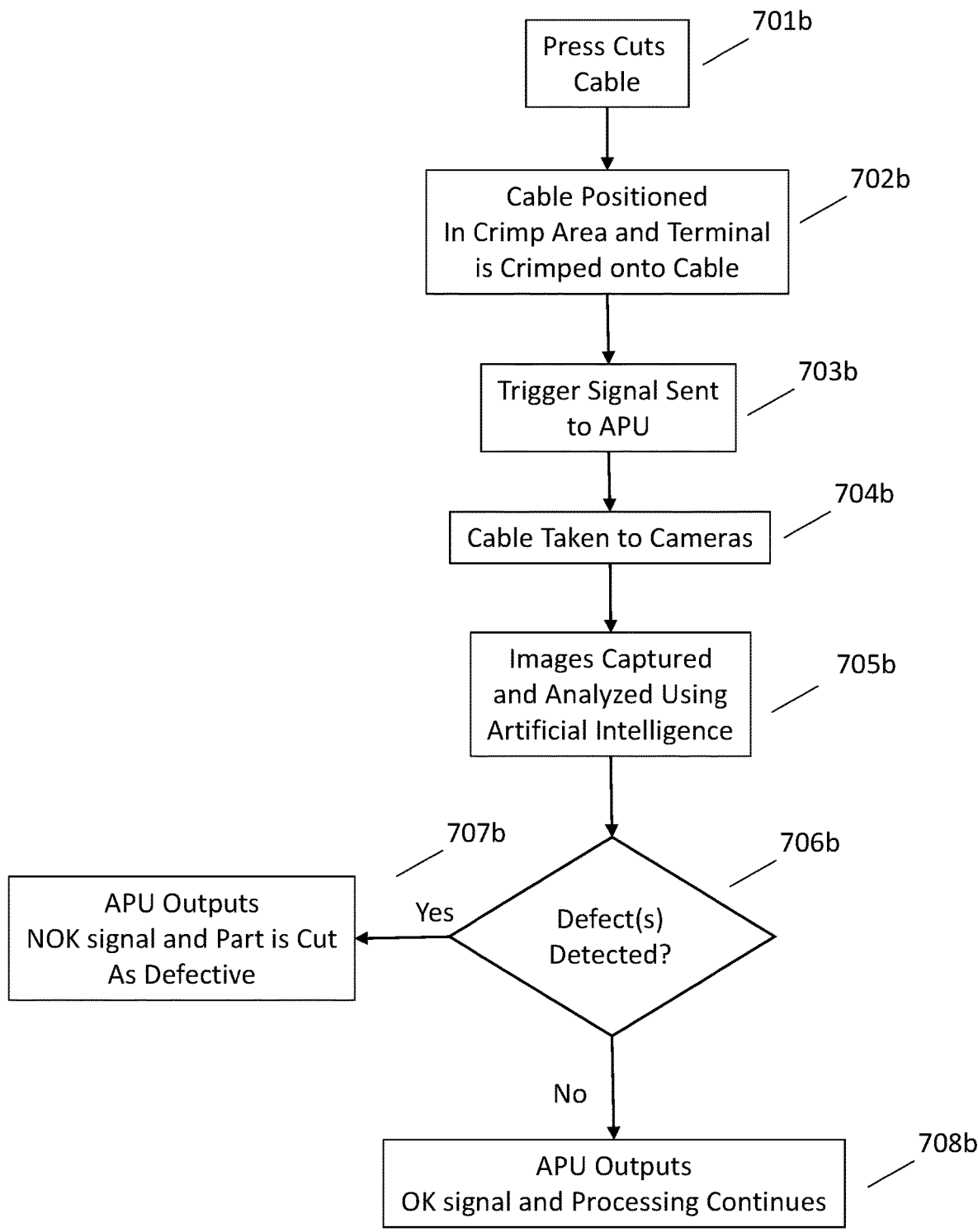
FIG. 7B illustrates an example method of controlling an automatic wire processing machine using image-based defect detection according to an embodiment.

FIG. 7B illustrates an example procedure for crimp inspection in automatic wire processing machines. In an automatic wire processing machine, the wire or cable is cut at 701b to prepare it for crimping. At 702b the cable is taken via robotic or automatic process to a crimp press (if crimp terminal is to be applied) and the terminal is crimped onto the cable. Thereafter a trigger is sent to the APU as indicated at 703b. The robotic or automatic process takes the cable to the imaging device cameras, as indicated at 704b, and images are captured and analyzed using artificial intelligence, as indicated at 705b. If a defect is detected at 706b, the APU outputs a NOK signal and the part is cut as defective. The process may then begin again. If the analysis does not find a defect at 706b, then the OK signal is output by the APU and the normal processing is allowed to continue, as indicated at 708b.

Figure 8A:
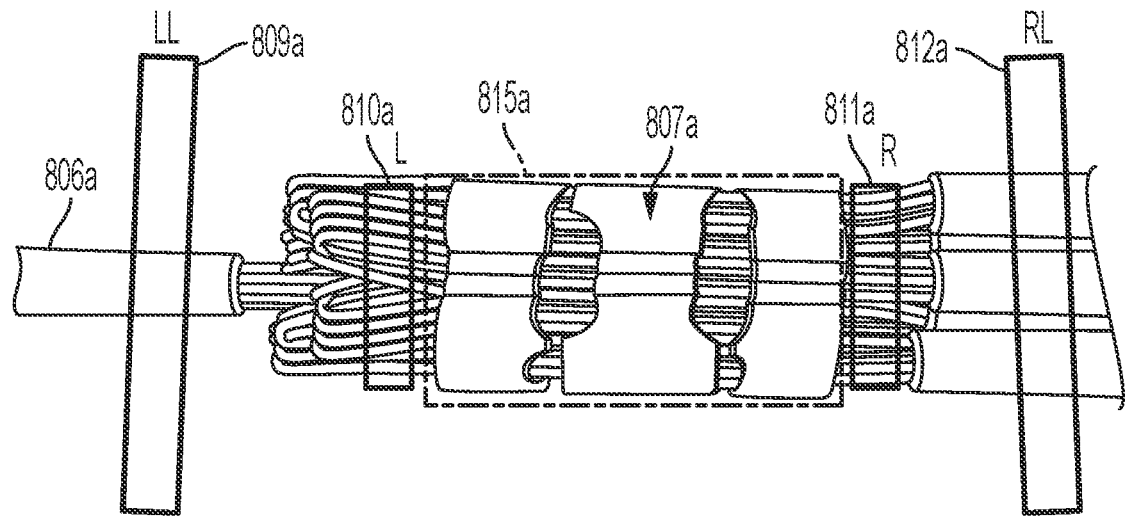
FIG. 8(A-B) illustrates an example of image-based defect detection according to an embodiment.
Figure 8B:
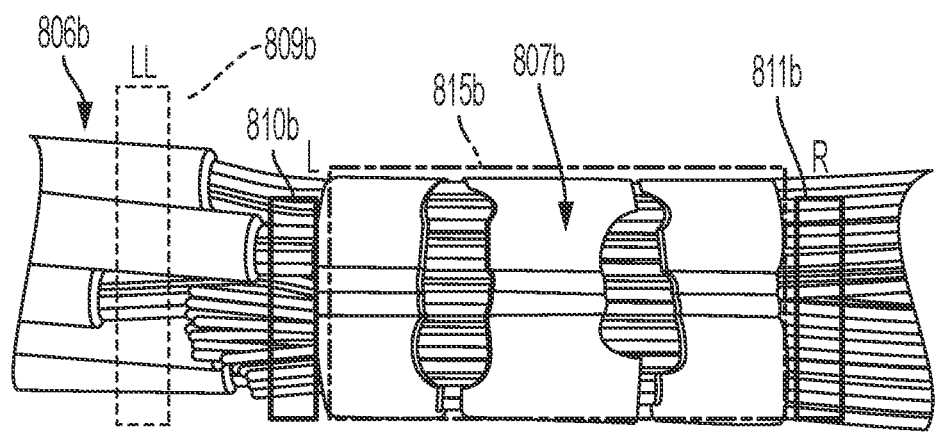

FIG. 8A-B illustrates an example of artificial intelligence defect detection. As shown in FIG. 8A, a splicing element 807a has been crimped onto the exposed copper ends of multiple insulated wires, one of which is indicated at 806a, joining them together. The element 807a, e.g., a crimp that splices multiple wires together, is identified automatically using an artificial neural network, for example built to recognize element 807a as crimped between multiple wire ends, joining them. This automatic identification permits placement of a bounding box 815a around the element 807a in the image (here only the top or upper image is illustrated for ease of description; however, a similar processing may be applied for the bottom or lower image).

The automatic identification of element 807a removes the need for selecting a program number and using a teach-in process, commonly required for conventional vision systems to locate the element 807a and set an origin point. As such, an embodiment may identify the element's 807a location in the images reliably without being trained to the particular set up (e.g., automatic press installation) to account for camera angles, lighting or other variables that might perturb traditional vision analysis systems. Further, the robust nature of the neural network identification permits the element 807a to be reliably identified in a manual process without a program selection and teach-in process, i.e., one in which the element 807a will be positioned for imaging manually and thus not precisely aligned.

Once the element 807a or other object of interest has been identified in the image, an embodiment may place image analysis windows at predetermined positions, e.g., for detection of given defects. An example of this is illustrated in FIG. 8A in which windows 809a, 810a, 811a, and 812a are automatically placed around the bounding box 815a at predetermined locations, selected for example on the basis the identification of feature 807a. This permits an embodiment to utilize these areas 809a-812a to analyze the image for defects, e.g., incorrect pixel color in a window selected from 809a-812a.

By way of specific example, FIG. 8B illustrates a defect detected automatically. In this non-limiting example, the defect includes lack of insulation or low insulation/low insertion of one wire (collectively indicated at 806b). This analysis utilizes automatically detected element 807b (detected using the artificial neural network, as described herein), with predetermined analysis windows 809b-811b being placed on the basis of the location and orientation of bounding box 815b, programmed for the specific element 807a and positioned according to its location detection automatically. Other factors may influence the positioning of the windows 809b-811b, e.g., a scaling factor may be applied given the size or orientation of the automatically placed bounding box 815b. Here, the expected pixel color of area 809b is black or lack of copper color. However, image analysis of this area 809b (e.g., evaluation of the pixel color values) indicates a significant (e.g., over a predetermined threshold value) amount of copper color pixels. This permits an embodiment to identify the defect, here low insulation/low insertion in the left side of the part, and output the appropriate NOK signal for controlling the manual crimp press or automatic wire processing machine, as described herein.

As will be appreciated by those having ordinary skill in the art, other objects (e.g., different types of terminals, welds, etc.) and different types of defects in addition to low insulation/low insertion may be identified using similar processing. For example, an artificial neural network can be trained to identify any part or feature of interest. Once the trained artificial neural network is capable of identifying the object of interest, suitable analysis window(s) can be automatically placed (after the artificial neural network identifies the object of interest) for detecting defects relevant to that particular object or part. By way of non-limiting example, other objects or features that can be identified include splices, crimps of various type (e.g., hex, overlap, indenter, etc.), bell mouth, brush, 50/50 window, insulation crimp wings, and ultrasonic welds. Further, defects that can be automatically detected after identifying objects of these types include insulation position (as in the example of FIG. 8B, etc.), bell mouth defects, brush defects, insulation crimp wing defects, e.g., wings bent down or under the wire, cable seal defects, wire strands pressed on top of the conductor crimp, and the like.

In an embodiment, the object identified and the defect detected may be one and the same. That is, the artificial neural network may be trained to identify the object defect directly. This removes the need to place analysis windows and perform additional image analysis, e.g., pixel color value evaluation. In an embodiment, both correctly formed objects and various object defects may be directly identified by an artificial intelligence process, e.g., an artificial neural network as described herein; this permits automatic identification of the defects and the correctly formed parts, as well as classification of the same for automatic and manual press control.

Figure 9:
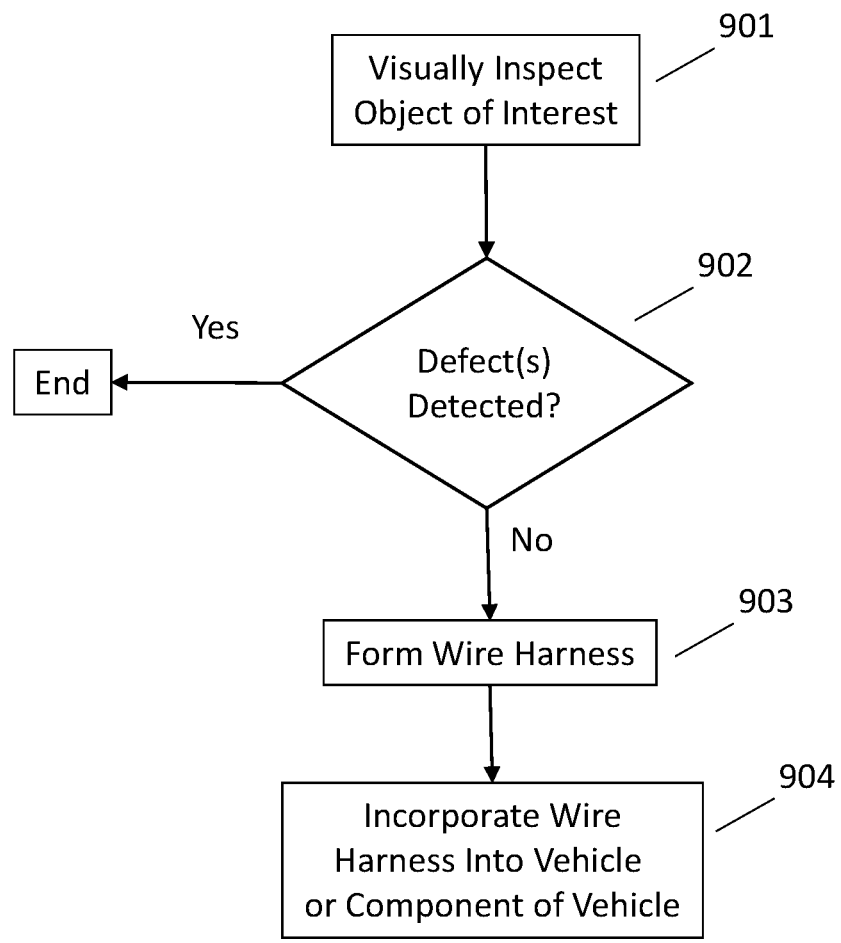
FIG. 9 illustrates a process for manufacturing a product according to an embodiment.

As illustrated in FIG. 9, a product may be formed via a process that includes an image-based inspection, as described herein and as indicated at 901. In an embodiment, an object is visually inspected, e.g., using artificial intelligence to automatically identify the object and/or analyze it. The object of interest may include an insulated wire that is combined with another element such as a terminal crimped onto the wire for attaching the wire to another component via the terminal. After the wire or wires have passed the visual inspection, as indicated at 902, they may be included in a vehicle wire harness, as indicated at 903, which may in turn be included in a vehicle, as illustrated at 904, such as an automobile, construction vehicle, aircraft or home appliance. For example, a wire harness of an automobile may include one or more wires formed by a process such as the manual or automated crimping processes described herein. Such a wire harness may be included or incorporated into vehicle, e.g., into a vehicle or automobile chassis, such that the process of making the wire harness or automobile includes the image-based inspection(s) described herein. Therefore, an embodiment includes a product, such as a wire harness or vehicle including a wire harness, formed via a process according to one of the embodiments.

As described herein, it will be readily understood that certain embodiments can be implemented using any of a wide variety of devices or combinations of devices, examples of which are described in connection with FIG. 4. It should be noted that the various functions described herein may be implemented using instructions stored on a memory, e.g., memory 430, that are transmitted to and executed by a processor, e.g., APU 420. Computer 410 includes one or more storage devices that store programs and other data. A storage device, as used herein, is a non-transitory storage medium. Some additional examples of a non-transitory storage device or medium include, but are not limited to, storage integral to computer 410, such as a memory or a solid-state drive, and removable storage, such as an SD card or a memory stick.

Program code stored in a memory or storage device may be transmitted using any appropriate transmission medium, including but not limited to wireless, wireline, optical fiber cable, RF, or any suitable combination of the foregoing.

Program code for carrying out operations may be written in any combination of one or more programming languages. The program code may execute entirely on a single device, partly on a single device, as a stand-alone software package, partly on a device and partly on another device, or entirely on another device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions (computer code) may be provided to a processor of a device to produce a special purpose machine, such that the instructions, which execute via a processor of the device implement the functions/acts specified.

It is worth noting that while specific elements are used in the figures, and a particular ordering of elements has been illustrated, these are non-limiting examples. In certain contexts, two or more elements may be combined, an element may be split into two or more elements, or certain elements may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of operating wire harness manufacturing equipment, comprising:
    adding, using the wire harness manufacturing equipment, an element to a wire to form a combination of the element and the wire;
    capturing, using an imaging device, one or more of an upper image and a lower image of the combination;
    analyzing, using one or more processors operatively coupled to the imaging device, the one or more of the upper image and the lower image to detect a defect;
    the analyzing comprising using a model pre-trained with a random set of training images including one or more objects of interest disposed therein; and
    thereafter indicating that the defect has been detected.

2. The method of claim 1, wherein the analyzing does not utilize data supplied during a teach-in mode for the wire harness manufacturing equipment.

3. The method of claim 1, wherein the analyzing comprises identifying the element as the object of interest in one or more of the upper image and the lower image and thereafter identifying the defect in one or more of the upper image and the lower image.

4. The method of claim 3, wherein the analyzing comprises, after identifying the element, examining one or more predetermined regions in one or more of the upper image and the lower image.

5. The method of claim 4, wherein the one or more predetermined regions are automatically identified in the upper image and the lower image using location information automatically obtained for the element.

6. The method of claim 1, wherein the capturing comprises moving the combination manually.

7. The method of claim 1, wherein the analyzing comprises utilizing an artificial intelligence program to detect the defect.

8. The method of claim 7, wherein the artificial intelligence program comprises a trained neural network.

9. The method of claim 8, wherein the trained neural network has been trained to identify the element.

10. The method of claim 9, wherein the trained neural network has not been trained to identify the defect.

11. The method of claim 1, wherein the element is one or more of a crimp, a seal, and another wire.

12. The method of claim 1, wherein the defect is one or more of insulation position defects, bell mouth defects, brush defects, cut off tab defects, crimp wing defects, incorrect wing bending defects, cable seal defects, and wire strands pressed on top of a conductor crimp defects.

13. A method, comprising:
    adding, using wire harness manufacturing equipment, an element to a wire to form a combination of the element and the wire;
    capturing, using an imaging device, one or more of an upper image and a lower image of the combination;

analyzing, using one or more processors operatively coupled to the imaging device, the one or more of the upper image and the lower image to detect if a defect is present;

the analyzing comprising using a model pre-trained using a random set of training images including one or more objects of interest disposed therein;

thereafter indicating that the defect has not been detected; and incorporating at least the combination of the element and the wire into a wire harness.

14. The method of claim 13, wherein the wire harness is one of a vehicle wire harness and an appliance wire harness.

15. The method of claim 14, comprising one or more of:

incorporating the vehicle wire harness into a vehicle; and incorporating the appliance wire harness into a home appliance.

16. The method of claim 15, wherein the vehicle is one or more of an automobile, a construction vehicle, and an aircraft.

17. A method, comprising:

obtaining, from an imaging device, one or more of an upper image and a lower image of an element added to a wire to form a combination of the element and the wire;

analyzing, using one or more processors, the one or more of the upper image and the lower image to detect a defect;

the analyzing comprising using a model pre-trained using a random set of training images including one or more objects of interest disposed therein; and thereafter indicating that the defect has been detected.

18. The method of claim 17, wherein the obtaining comprises moving the combination manually to the imaging device.

19. The method of claim 17, wherein the analyzing comprises using an artificial neural network to identify the element.

20. The method of claim 17, wherein the analyzing comprises using an artificial neural network to identify the defect directly.

* * * * *